(12) United States Patent
Ishikawa et al.

(10) Patent No.: US 10,848,080 B2
(45) Date of Patent: Nov. 24, 2020

(54) MOTOR DRIVE CIRCUIT

(71) Applicant: NIDEC SERVO CORPORATION, Kiryu (JP)

(72) Inventors: Masatomo Ishikawa, Kiryu (JP); Masahiro Tsuchiya, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 0 days.

(21) Appl. No.: 16/316,633

(22) PCT Filed: Aug. 8, 2017

(86) PCT No.: PCT/JP2017/028657
§ 371 (c)(1),
(2) Date: Jan. 10, 2019

(87) PCT Pub. No.: WO2018/030362
PCT Pub. Date: Feb. 15, 2018

(65) Prior Publication Data
US 2019/0253008 A1 Aug. 15, 2019

(30) Foreign Application Priority Data

Aug. 8, 2016 (JP) ................................. 2016-155627

(51) Int. Cl.
*H02P 3/12* (2006.01)
*H02M 7/48* (2007.01)
(Continued)

(52) U.S. Cl.
CPC ............ *H02P 3/12* (2013.01); *F04D 25/0693* (2013.01); *F04D 27/004* (2013.01); *H02M 7/48* (2013.01);
(Continued)

(58) Field of Classification Search
CPC .. H02P 3/12; H02P 3/22; H02P 6/182; H02M 7/48; F05D 2260/90
See application file for complete search history.

(56) References Cited

U.S. PATENT DOCUMENTS 7,567,044 B2 * 7/2009 Matsuhashi ............... H02P 3/12
188/159
10,418,919 B2 * 9/2019 Lo ............................ H02P 3/18
(Continued)

FOREIGN PATENT DOCUMENTS

JP 05-84196 U 11/1993

OTHER PUBLICATIONS

Official Communication issued in International Patent Application No. PCT/JP2017/028657, dated Nov. 21, 2017.

*Primary Examiner* — Bickey Dhakal
(74) *Attorney, Agent, or Firm* — Keating & Bennett (57) ABSTRACT

A motor drive circuit includes an upper switch, a lower switch connected in series with the upper switch and drives a brushless DC motor, a gate drive circuit that drives the lower switch and a brake circuit that uses an inductive voltage generated by the brushless DC motor to apply a voltage to a gate terminal of the lower switch via the gate drive circuit and turns on the lower switch. The gate drive circuit includes a push element that applies a predetermined source voltage to the gate terminal when on, a pull element that pulls out charge from the gate terminal when on, and a rectifier between the push element and the gate terminal to rectify current in a direction from the push element toward the gate terminal.

14 Claims, 8 Drawing Sheets

(51) Int. Cl.
*H02P 6/182* (2016.01)
*H02P 3/22* (2006.01)
*F04D 27/00* (2006.01)
*F04D 25/06* (2006.01)

(52) U.S. Cl.
CPC ............... *H02P 3/22* (2013.01); *H02P 6/182* (2013.01); *F05D 2260/90* (2013.01)

(56) References Cited

U.S. PATENT DOCUMENTS

| | | |
|---|---|---|
| 2007/0222290 A1 | 9/2007 | Matsuhashi |
| 2008/0170345 A1* | 7/2008 | Tanabe ................ H03K 17/063 361/79 |
| 2013/0207581 A1 | 8/2013 | Aoki |
| 2013/0271046 A1* | 10/2013 | Sussman ................ H02P 3/02 318/379 |
| 2018/0258939 A1* | 9/2018 | Otsuka ................ F04D 25/06 |

* cited by examiner

MOTOR DRIVE CIRCUIT

BACKGROUND OF THE INVENTION

1. Field of the Invention

The present disclosure relates to a motor drive circuit.

2. Description of the Related Art

Conventionally, brushless direct current (DC) motors have been utilized in various kinds of equipment, and some of them have been mounted in blowers in particular. The recent needs for such a brushless DC motor mounted in the blower are noise reduction and efficiency improvement of the motor. To this end, the motor has to employ sine-wave drive or vector control. In this case, a motor drive circuit of a so-called 120-degree conduction mode cannot cope with such drive or control, and the motor drive circuit has to employ 180-degree conduction mode.

Meanwhile, a propeller (impeller) of the blower in a not-conducting state may be rotated by receiving wind from outside. Particularly when the wind is strong, the propeller may be rotated at extremely high speed. If the propeller is rotated at high speed during works such as installation or maintenance of the blower, this may obstruct the works of the worker. Thus, the motor for rotating the propeller in such a blower has to be braked in the not-conducting state.

The existing drive control device of a brushless motor, for example, has been known. This drive control device includes a pre-drive circuit that drives switching elements of an inverter circuit and a control circuit. Once detecting stop of power supply from a DC power source, which applies voltage to the inverter circuit, the control circuit outputs a short brake signal to the pre-drive circuit.

However, the existing drive control device cannot brake the motor in the not-conducting state, since the pre-driver circuit and the control circuit during the short brake operation have to be supplied with power.

SUMMARY OF THE INVENTION

A motor drive circuit exemplified in the present disclosure, which includes an upper switch and a lower switch connected in series with the upper switch and drives a brushless DC motor, includes: a gate drive circuit that drives the lower switch and a brake circuit that uses an inductive voltage generated by the brushless DC motor to apply a voltage to a gate terminal of the lower switch via the gate drive circuit and turns on the lower switch, in which the gate drive circuit includes a push element that applies a predetermined source voltage to the gate terminal when the push element is turned on, a pull element that pulls out charge from the gate terminal when the pull element is turned on, and a rectifier that is between the push element and the gate terminal and rectifies current in a direction from the push element toward the gate terminal.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Exemplified embodiments of the present disclosure are described below with reference to the drawings.

Figure 1:
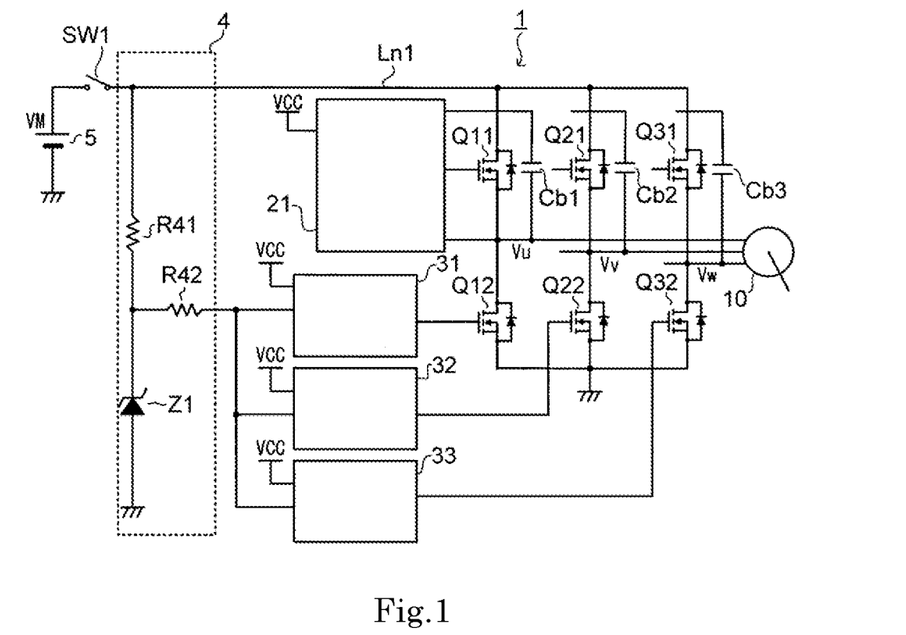
FIG. 1 is a diagram that illustrates an overall configuration of a motor drive circuit according to an exemplary embodiment of the present disclosure.

FIG. 1 is a diagram that illustrates an overall configuration of a motor drive circuit according to an embodiment of the present disclosure. A motor drive circuit 1 illustrated in FIG. 1 is a circuit that drives a motor 10. The motor drive circuit 1 and the motor 10 form a motor device according to this embodiment.

The motor drive circuit 1 includes an inverter that includes a first upper switching element Q11, a first lower switching element Q12, a second upper switching element Q21, a second lower switching element Q22, a third upper switching element Q31, and a third lower switching element Q32. In addition, the motor drive circuit 1 includes capacitors Cb1 to Cb3, a first upper field-effect transistor (FET) gate drive circuit 21, a not-illustrated second upper FET gate drive circuit 22, a not-illustrated third upper FET gate drive circuit 23, a first lower FET gate drive circuit 31, a second lower FET gate drive circuit 32, a third lower FET gate drive circuit 33, a brake circuit 4, a DC power source 5, and a switch SW1.

The motor 10 is formed of a brushless DC motor. Here, the motor 10 is described as a three-phase brushless DC motor as an example. The motor 10 includes a stator and a rotor. The rotor rotates relatively to the stator while facing the stator with a space in between and includes a permanent magnet. The stator includes a U-phase winding, a V-phase winding, and a W-phase winding.

The motor drive circuit 1 and the motor 10 are mounted in a blower, for example. In this case, a non-illustrated propeller is fixed to the rotor of the motor 10. The motor 10 rotates the propeller to generate the wind and cools down a cooling target. The cooling target may be communication equipment, for example.

The first upper switching element Q11 and the first lower switching element Q12 are respectively formed of n-channel metal-oxide-semiconductor field-effect transistors (MOSFETs). A drain terminal of the first upper switching element Q11 is connected to a line Ln1 to which a voltage VM generated by the DC power source 5 when the switch SW1 is turned on is applied. A source terminal of the first upper switching element Q11 is connected to a drain terminal of the first lower switching element Q12. A ground potential is applied to a source terminal of the first lower switching element Q12. That is, the first lower switching element Q12 is connected in series with the first upper switching element Q11. A connection point at which the source terminal of the first upper switching element Q11 and the drain terminal of the first lower switching element Q12 are connected is connected to the U-phase winding of the motor 10.

The second upper switching element Q21 and the second lower switching element Q22 are respectively formed of the re-channel MOSFETs and are connected in series with each other like the abovementioned first upper switching element Q11 and first lower switching element Q12. A connection point at which a source terminal of the second upper switching element Q21 and a drain terminal of the second lower switching element Q22 are connected is connected to the V-phase winding of the motor 10.

The third upper switching element Q31 and the third lower switching element Q32 are respectively formed of the n-channel MOSFETs and are connected in series with each other like the abovementioned first upper switching element Q11 and first lower switching element Q12. A connection point at which a source terminal of the third upper switching element Q31 and a drain terminal of the third lower switching element Q32 are connected is connected to the W-phase winding of the motor 10.

As described above, multiple pairs of the upper switching element and the lower switching element (Q11 and Q12, Q21 and Q22, Q31 and Q32) are provided corresponding to the multiple phases of the brushless DC motor (10), and the multiple gate drive circuits (31, 32, 33) are provided corresponding to the multiple lower switching elements (Q12, Q22, Q32).

This makes it possible to apply voltages and currents as instructed by a not-illustrated micro control unit (MCU) to the multiple phases of the motor 10, for example.

Figure 2:
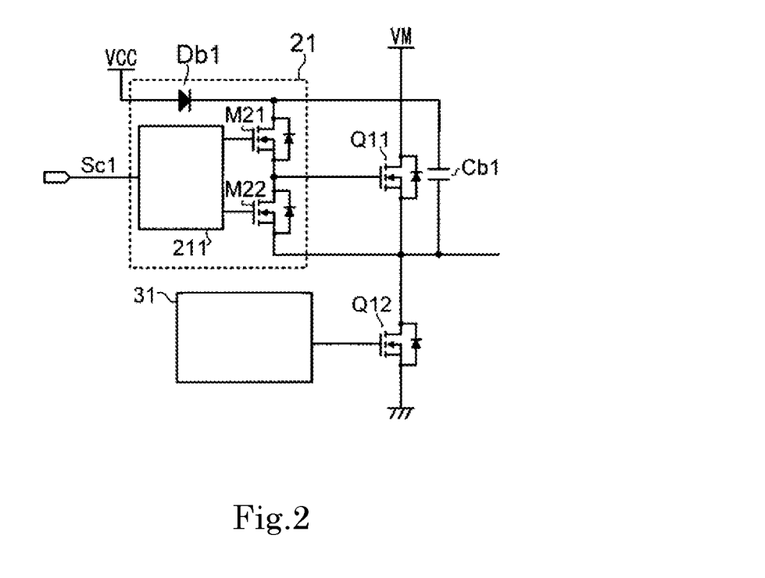
FIG. 2 is a diagram that illustrates a specific configuration example of a first upper FET gate drive circuit.

The first upper FET gate drive circuit 21 drives the first upper switching element Q11. FIG. 2 is a diagram that illustrates a specific configuration example of the first upper FET gate drive circuit 21. The first upper FET gate drive circuit 21 includes a push element M21, a pull element M22, a gate driver 211, and a diode Db1.

A source voltage VCC is applied to an anode of the diode Db1. A cathode of the diode Db1 is connected to one end of the capacitor Cb1. The other end of the capacitor Cb1 is connected to the connection point at which the first upper switching element Q11 and the first lower switching element Q12 are connected. The diode Db1 and the capacitor Cb1 are provided for bootstrapping.

The push element M21 and the pull element M22 are respectively formed of the n-channel MOSFETs. A drain terminal of the push element M21 is connected to the cathode of the diode Db1. A source terminal of the push element M21 is connected to a drain terminal of the pull element M22. A source terminal of the pull element M22 is connected to the connection point at which the first upper switching element Q11 and the first lower switching element Q12 are connected. A connection point at which the source terminal of the push element M21 and the drain source of the pull element M22 are connected is connected to a gate terminal of the first upper switching element Q11.

In response to an inputted upper gate control signal Sc1, the gate driver 211 applies a voltage to both a gate terminal of the push element M21 and a gate terminal of the pull element M22 to drive on and off of the push element M21 and the pull element M22. The upper gate control signal Sc1 is inputted from the not-illustrated MCU, for example.

When the gate driver 211 turns off the push element M21 and turns on the pull element M22, the gate terminal and the source terminal of the first upper switching element Q11 are short-circuited, and thus the first upper switching element Q11 is turned off. At this time, the capacitor Cb1 is charged by a DC voltage VCC via the diode Db1.

When the gate driver 211 turns on the push element M21 and turns off the pull element M22, since the capacitor Cb1 is charged, the voltage to be applied to the gate terminal of the first upper switching element Q11 is a sum of the voltage applied to the source terminal of the first upper switching element Q11, and a voltage lower than the source voltage VCC by a forward voltage of the diode Db1. Accordingly, the first upper switching element Q11 is turned on.

In this way, the first upper FET gate drive circuit 21, which is configured as a push-pull circuit including the push element M21 and the pull element M22, drives on and off of the first upper switching element Q11.

Although it is not illustrated in FIG. 1, in the motor drive circuit 1, the second upper FET gate drive circuit 22 and the third upper FET gate drive circuit 23, which have configurations similar to that of the abovementioned first upper FET gate drive circuit 21, are provided so as to correspond to a pair of the second upper switching element Q21 and the capacitor Cb2 for bootstrapping and a pair of the third upper switching element Q31 and the capacitor Cb3 for bootstrapping, respectively. Thus, the second upper FET gate drive circuit 22 drives on and off of the second upper switching element Q21 and the third upper FET gate drive circuit 23 drives on and off of the third upper switching element Q31.

Figure 3:
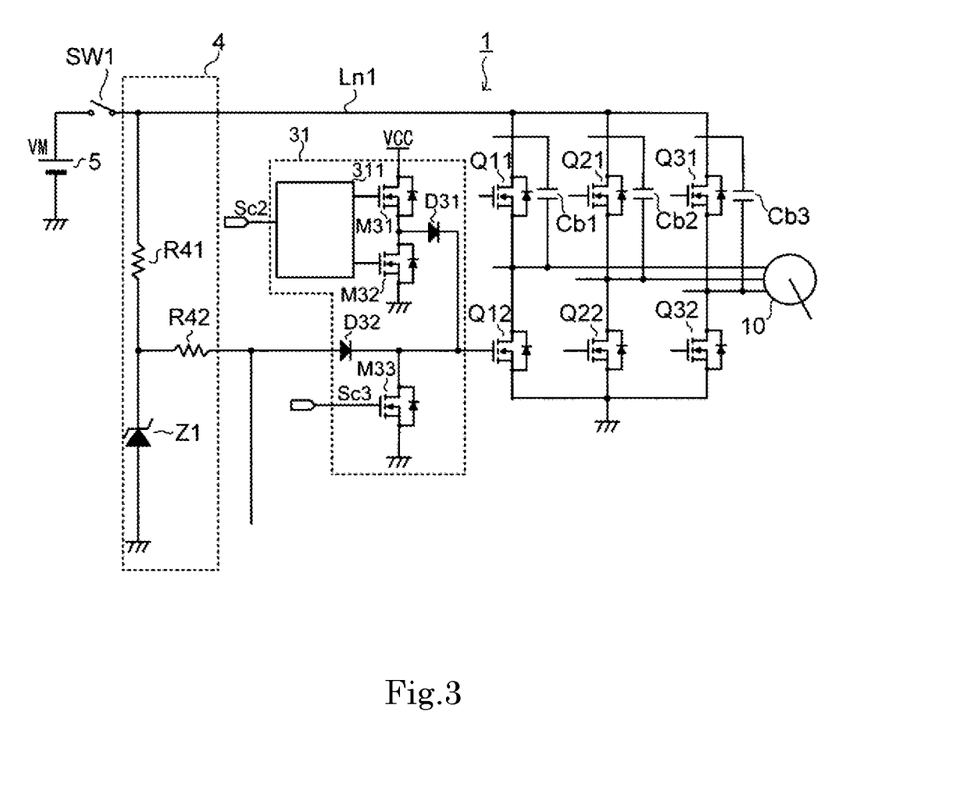
FIG. 3 is a diagram that illustrates a specific configuration example of a first lower FET gate drive circuit.

In FIG. 1, the first lower FET gate drive circuit 31 drives the first lower switching element Q12. FIG. 3 is a diagram that illustrates a specific configuration example of the first lower FET gate drive circuit 31. The first lower FET gate drive circuit 31 includes a push element M31, a pull element M32, a pull element M33, a first diode D31, a second diode D32, and a gate driver 311.

The push element M31 and the pull element M32 are respectively formed of the n-channel MOSFETs. The source voltage VCC is applied to a drain terminal of the push element M31. A source terminal of the push element M31 is connected to a drain terminal of the pull element M32. The ground potential is applied to a source terminal of the pull element M32. That is, the gate drive circuit (31) includes the second pull element (M32) connected in series with the push element (M31).

Once the gate driver 311 applies a gate voltage to gate terminals of the push element M31 and the pull element M32 in response to a lower gate control signal Sc2, the push element M31 and the pull element M32 are driven to be on or off. For example, when a gate terminal of a switching element is connected to a connection point at which the push element M31 and the pull element M32 are connected, although it is possible to drive on and off of the above switching element by a push-pull circuit including the push element M31 and the pull element M32, this embodiment does not use such a function for the pull element M32 forming the push-pull circuit. Accordingly, while using a general-purpose IC configured as the push-pull circuit, the pull element M32 is not used and only the push element M31 is used in this push-pull circuit.

The pull element M33 is formed of the n-channel MOSFET and includes a gate terminal as a control terminal, a drain terminal as a current inflow terminal, and a source terminal as a current outflow terminal. The drain terminal of the pull element M33 is connected to a gate terminal of the first lower switching element Q12. The ground potential is applied to the source terminal of the pull element M33. Once a lower gate control signal Sc3 is applied to the gate terminal of the pull element M33, the pull element M33 is driven to be on or off. In this way, the pull element M33 forms an open-drain circuit. The lower gate control signals Sc2 and Sc3 are inputted by the not-illustrated MCU, for example. As described above, the pull element (M33) is a transistor including the control terminal, the current inflow terminal, and the current outflow terminal, in which the current inflow terminal is connected to the gate terminal of the lower switching element (Q12) while potential lower than that applied to the above gate terminal is applied to the current outflow terminal.

The pull element M33 is not limited to be formed of the MOSFET but may be formed of a bipolar transistor, for example. In this case, the pull element M33 forms an open-collector circuit.

An anode of the first diode D31 as a rectifier is connected to the connection point at which the push element M31 and the pull element M32 are connected. A cathode of the first diode D31 is connected to the gate terminal of the first lower switching element Q12. That is, the rectifier is the first diode (D31), the anode of the first diode is connected to the push element (M31), and the cathode of the first diode is connected to the above gate terminal. The first diode D31 is arranged between the push element M31 and the gate terminal of the first lower switching element Q12 and rectifies current in a direction from the push element M31 toward the above gate terminal.

A cathode of the second diode D32 is connected to the gate terminal of the first lower switching element Q12. An anode of the second diode D32 is connected to the line Ln1 via the later-described brake circuit 4. That is, the gate drive circuit (31) includes the second diode (D32), the cathode of the second diode is connected to the above gate terminal, and the anode of the second diode is connected to the brake circuit (4).

As illustrated in FIG. 1, in the motor drive circuit 1, the second lower FET gate drive circuit 32 and the third lower FET gate drive circuit 33, which have configurations similar to that of the abovementioned first lower FET gate drive circuit 31, are provided so as to correspond to the second lower switching element Q22 and the third lower switching element Q32, respectively. That is, the multiple (three) lower FET gate drive circuits are provided so as to correspond to the multiple (three) lower switching elements.

The second lower FET gate drive circuit 32 and the third lower FET gate drive circuit 33 respectively include diodes similar to the second diode D32 of the first lower FET gate drive circuit 31. The anodes of the three second diodes are connected to each other in a later stage of the brake circuit 4.

Figure 4:
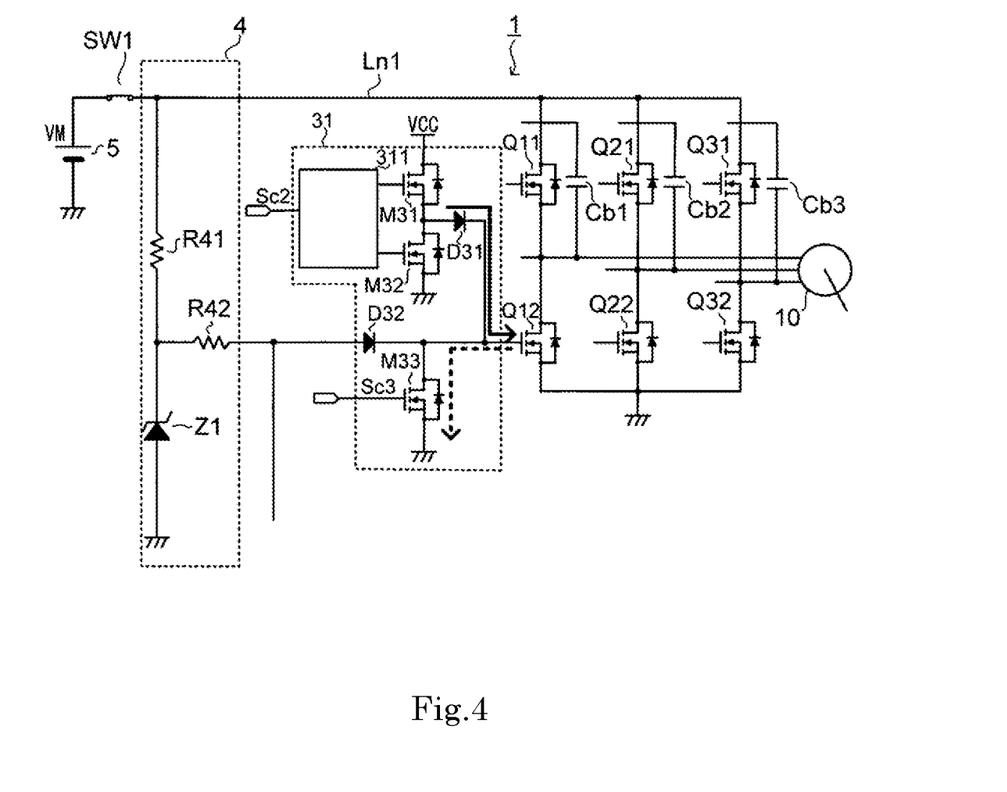
FIG. 4 is a diagram that describes a driving operation by the first lower FET gate drive circuit in a normal time or in a conducting state.

Next, driving operation by the lower FET gate drive circuit is described with reference to FIG. 4. FIG. 4 is a diagram that describes the driving operation by the first lower FET gate drive circuit 31 in a normal time or in a conducting state. In the normal time, the switch SW1 is turned on and a voltage VM is applied to the line Ln1 by the DC power source 5.

When the push element M31 is turned on by the lower gate control signal Sc2 (the pull element M32 is turned off) and the pull element M33 is turned off by the lower gate control signal Sc3, the push element M31 applies the source voltage VCC to the gate terminal of the first lower switching element Q12 via the first diode D31 (solid-line arrow). Accordingly, the gate capacity of the first lower switching element Q12 is charged and the first lower switching element Q12 is turned on.

On the other hand, when the push element M31 is turned off by the lower gate control signal Sc2 (the pull element M32 is turned on) and the pull element M33 is turned on by the lower gate control signal Sc3, the pull element M33 quickly pulls out potential from the gate terminal of the first lower switching element Q12 (broken-line arrow). Accordingly, the first lower switching element Q12 is turned off.

In this way, the push-pull circuit configuration including the push element M31 and the pull element M33 makes it possible to quickly drive switching of the first lower switching element Q12. With the similar operation, the second lower FET gate drive circuit 32 and the third lower FET gate drive circuit can quickly drive switching of the second lower switching element Q22 and the third lower switching element Q32, respectively.

In this case, since a diode corresponding to the second diode D32 is provided in each lower FET gate drive circuit, when the source voltage VCC is applied to the gate terminal of the lower switching element, it is possible to prevent current from flowing backward toward the lower FET gate drive circuit of another phase and maintain independency of the voltage application to the gate terminal of the lower switching element of each phase.

Figure 5:
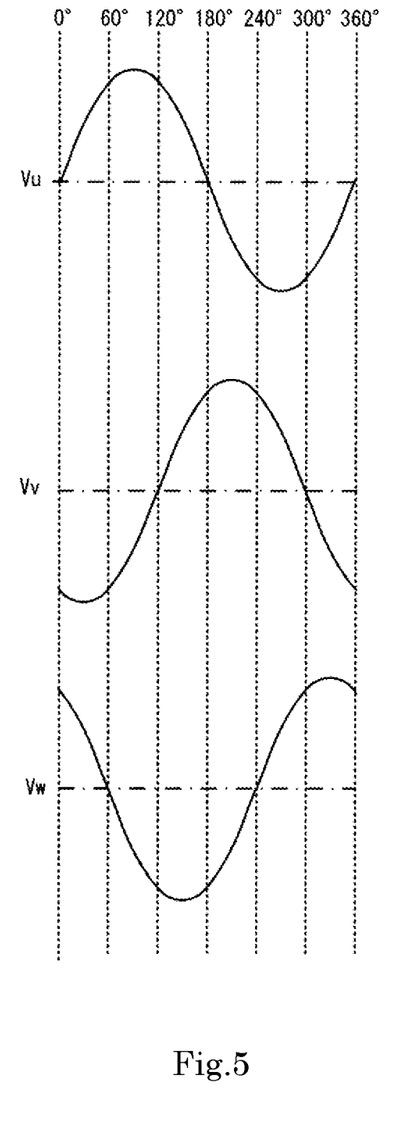
FIG. 5 is a diagram that illustrates a waveform example of voltages applied to phase windings of a motor by the motor drive circuit.

Next, driving of the motor 10 using the motor drive circuit 1 according to this embodiment is described. FIG. 5 is a diagram that illustrates a waveform example of voltages applied to phase windings of the motor 10 by the motor drive circuit 1. In the order from top to bottom in FIG. 5, illustrated are a voltage Vu applied to the U-phase winding, a voltage Vv applied to the V-phase winding, and a voltage Vw applied to the W-phase winding. An angle in a transverse direction in FIG. 5 indicates a rotation angle position of the rotor in the motor 10. Note that, as illustrated in FIG. 1, the voltage Vu is generated at the connection point at which the first upper switching element Q11 and the first lower switching element Q12 are connected, the voltage Vv is generated at the connection point at which the second upper switching element Q21 and the second lower switching element Q22 are connected, and the voltage Vw is generated at the connection point at which the third upper switching element Q31 and the third lower switching element Q32 are connected.

Figure 6:
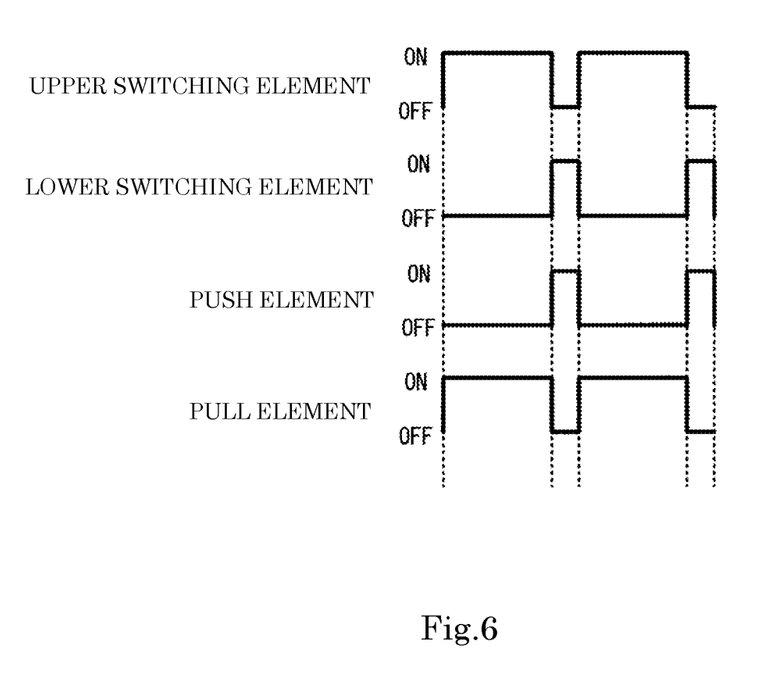
FIG. 6 is a timing chart that illustrates an example of complementary switching of an upper switching element and a lower switching element and switching of a push element and a pull element.

In the meantime, pulse width modulation (PWM) switching of the upper switching element and the lower switching element of the corresponding phase is complementally driven for generating the voltage Vu, Vv, or Vw in FIG. 5. FIG. 6 is a timing chart that illustrates an example of complementary switching of the upper switching element and the lower switching element and switching of the push element and the pull element at that time (for the first lower FET gate drive circuit 31, the elements are M31 and M33).

For the upper switching element and the lower switching element, complementary switching such that one is turned on while the other is turned off is performed, and on-time duty (ratio of on-time to switching cycle) is variable. Note that, occurrence of penetrating current may be prevented by providing dead time at which both the switching elements are turned off at timing of the switching. Such a method of switching is included in the complementary switching.

In the period from 0° to 360° in FIG. 5, the complementary switching of the upper switching element and the lower switching element is repeated while changing the duty, thereby applying the sine wave-form voltages Vu, Vv, and Vw of these phases to drive the motor 10. The voltage of the sine wave varies in a range from the ground potential to the voltage VM, and the voltages Vu, Vv, and Vw are out of phase with each other by 120°.

As illustrated in FIG. 6, while the lower switching element is turned off, the push element is turned off and the pull element is turned on, and while the lower switching element is turned on, the push element is turned on and the pull element is turned off. As described above, in this embodiment, the configuration in which the lower switching element is driven using the push element and the pull element makes it possible to quickly drive switching of the lower switching element. As a result, it is possible to achieve the complementary PWM switching of the upper switching element and the lower switching element, and thus driving of the motor 10 with the 180-degree conduction mode is achieved.

Next, braking operation of the motor 10 in the not-conducting state using the motor drive circuit 1 according to the embodiment of the present disclosure is described.

As illustrated in FIG. 1, the brake circuit 4 included in the motor drive circuit 1 includes a resistor R41, a resistor R42, and a Zener diode Z1. The resistor R41 and the resistor R42 are connected in series with each other between the line Ln1 and the anode of the second diode D32. Note that, although FIG. 1 illustrates that the brake circuit 4 includes the two resistors R41 and R42, the brake circuit 4 may include three or more resistors or only one resistor. That is, the brake circuit 4 may include at least one resistor element. The brake circuit (4) includes at least one resistor element (R41, R42) and uses the resistor element to convert an inductive voltage (described later), which is generated by the brushless DC motor (10), to a voltage lower than the above inductive voltage and apply the converted voltage to the gate terminal of the lower switching element (Q12).

A cathode of the Zener diode Z1 is connected to a connection point at which the resistor R41 and the resistor R42 are connected. The ground potential is applied to an anode of the Zener diode Z1. That is, the brake circuit (4) further includes the Zener diode (Z1), the cathode of the Zener diode is connected to a route for applying a voltage to the above gate terminal based on the above inductive voltage, and a predetermined potential is applied to the anode of the Zener diode.

Figure 7A:
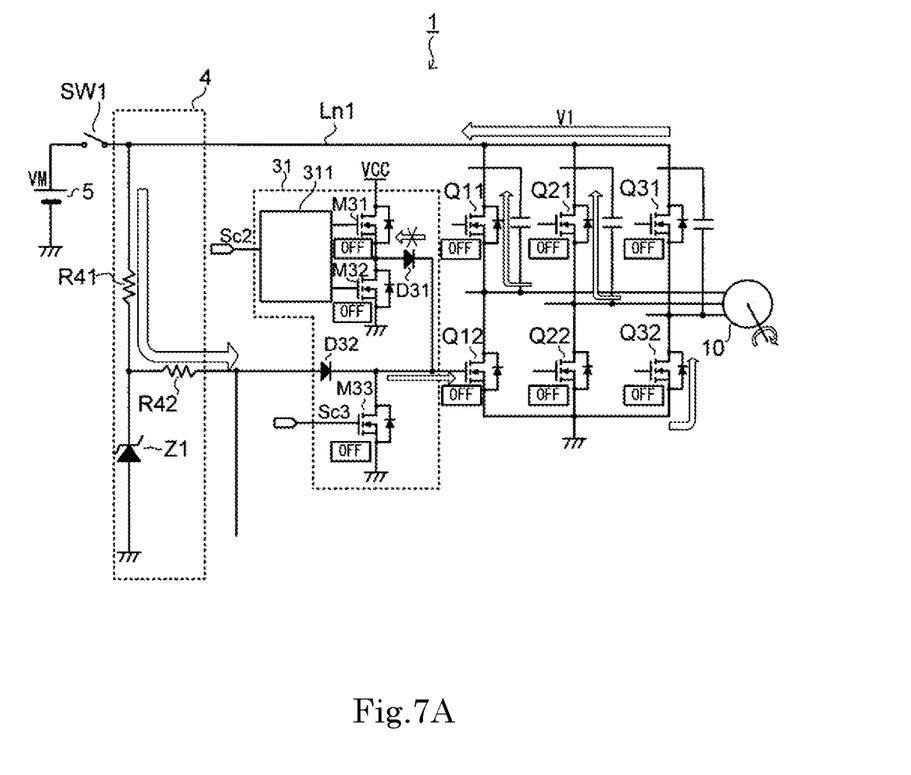
FIG. 7A is a diagram that illustrates a state of the motor drive circuit immediately after external force is applied to the motor in a not-conducting state.

Here, FIG. 7A illustrates a state of the motor drive circuit 1 immediately after the external force is applied to the motor 10 in the not-conducting state. For example, the case where external force is applied to the motor 10 is a case where the propeller fixed to the rotor included in the motor 10 is rotated by the wind.

As illustrated in FIG. 7A, in the not-conducting state, the switch SW1 is turned off, and not only the push element M31, the pull element M32, and the pull element M33 but also the first upper switching element Q11, the first lower switching element Q12, the second upper switching element Q21, the second lower switching element Q22, the third upper switching element Q31, and the third lower switching element Q32 are all turned off.

Here, when the rotor of the motor 10 is rotated by the external force, inductive voltages are generated in the U-phase winding, the V-phase winding, and the W-phase winding of the motor 10. The inductive voltages are three-phase AC voltages and are varied in accordance with the rotation speed and the position of the rotor. FIG. 7A is an example in which the inductive voltage of the W-phase is the minimum value and that of the U-phase is the maximum value among the three-phase inductive voltages. The W-phase inductive voltage is fixed to the ground potential via a parasitic diode of the third lower switching element Q32. Thus, an inductive voltage V1, which is equal to a potential difference between the U-phase inductive voltage and the W-phase inductive voltage, is generated in the line Ln1.

Figure 7B:
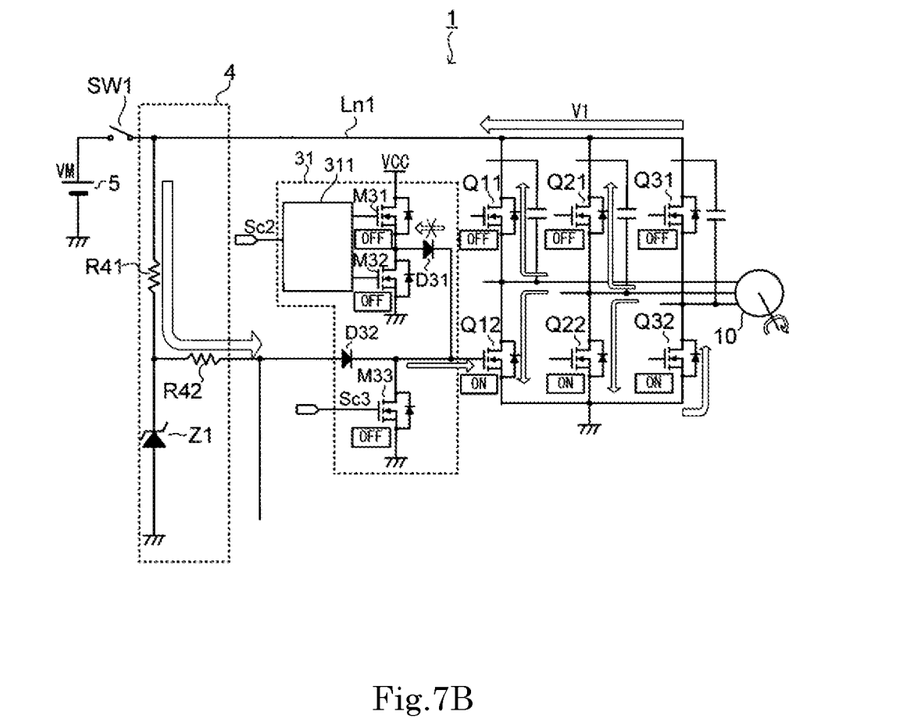
FIG. 7B is a diagram that illustrates a state of the motor drive circuit when short brake is applied to the motor in the not-conducting state.

The brake circuit 4 uses the resistor R41 and the resistor R42 to convert the inductive voltage V1 to a voltage lower than the inductive voltage V1 and applies the converted voltage to the gate terminal of the first lower switching element Q12 via the second diode D32. That is, the brake circuit 4 uses the inductive voltage V1 to apply the voltage to the gate terminal of the first lower switching element Q12 via the first lower FET gate drive circuit 31 and turns on the first lower switching element Q12. This state is illustrated in FIG. 7B. Here, turning on of the first lower switching element Q12 is an on-operation in a linear region. Accordingly, when the first lower switching element Q12 is completely turned on, current toward the first upper switching element Q11 is interrupted, and this avoids a repeat of turning on and off the first lower switching element Q12. That is, this makes it possible to allow current to flow toward the first lower switching element Q12 while current flows toward the first upper switching element Q11 and maintain the on-state of the first lower switching element Q12.

At this time, since the first diode D31 avoids flow of current from between the second diode D32 and the lower switching element Q12 toward the push element M31, it is possible to prevent drop of the voltage applied to the gate terminal. In addition, conversion of the inductive voltage V1 to a lower voltage using the resistors R41 and R42 makes it possible to adjust the voltage to an application voltage suitable for the withstand voltage of the first lower switching element Q12.

Although it is not illustrated in FIG. 7B, similarly, the brake circuit 4 applies the voltage to the gate terminal of the second lower switching element Q22 via the second lower FET gate drive circuit 32 based on the inductive voltage V1 to allow the second lower switching element Q22 to perform the on-operation in the linear region, and applies the voltage to the gate terminal of the third lower switching element Q32 via the third lower FET gate drive circuit 33 based on the inductive voltage V1 to allow the third lower switching element Q32 to perform the on-operation in the linear region.

As a result, as illustrated in FIG. 7B, current flows from the U-phase winding of the motor 10 toward the ground via the first lower switching element Q12 that performs the on-operation in the linear region, current flows from the V-phase winding of the motor 10 toward the ground via the second lower switching element Q22 that performs the on-operation in the linear region, and current flows toward the motor 10 via the parasitic diode of the third lower switching element Q32. This applies short brake to the motor 10. Note that, the lower switching element through which current flows is varied in accordance with the positional relationship between the windings and the rotor in the motor 10.

The cathode of the Zener diode Z1 is connected to the connection point at which the resistor R41 and the resistor R42 are connected. The ground potential is applied to the anode of the Zener diode Z1. That is, the cathode of the Zener diode Z1 is connected to the route for applying a voltage to the gate terminal of the lower switching element based on the inductive voltage V1, and a predetermined potential is applied to the anode of the Zener diode Z1. This makes it possible to limit the voltage at the connection point at which the resistor R41 and the resistor R42 are connected to be the Zener voltage of the Zener diode Z1 even when an excessive inductive voltage V1 is generated. Accordingly, it is possible to prevent the lower switching element from being broken due to application of a voltage exceeding the withstand voltage to the gate terminal of the lower switching element.

As described above, the motor drive circuit (1) according to the present embodiment is a motor drive circuit, which includes the upper switching element (Q11) and the lower switching element (Q12) connected in series with the upper switching element and drives the brushless DC motor (10), and includes:

the gate drive circuit (31) that drives the lower switching element and the brake circuit (4) that uses an inductive voltage generated by the brushless DC motor to apply a voltage to a gate terminal of the lower switching element via the gate drive circuit and turns on the lower switching element.

The gate drive circuit (31) includes the push element (M31) that applies a predetermined source voltage to the gate terminal when the push element is turned on, the pull element (M33) that pulls out charge from the gate terminal when the pull element is turned on, and the rectifier (D31) that is arranged between the push element and the gate terminal and rectifies current in a direction from the push element toward the gate terminal.

According to the motor drive circuit 1 of this embodiment, it is possible to drive the motor 10 or the brushless DC motor with the 180-degree conductance mode and apply the short brake to the motor 10 in the not-conducting state.

Figure 8:
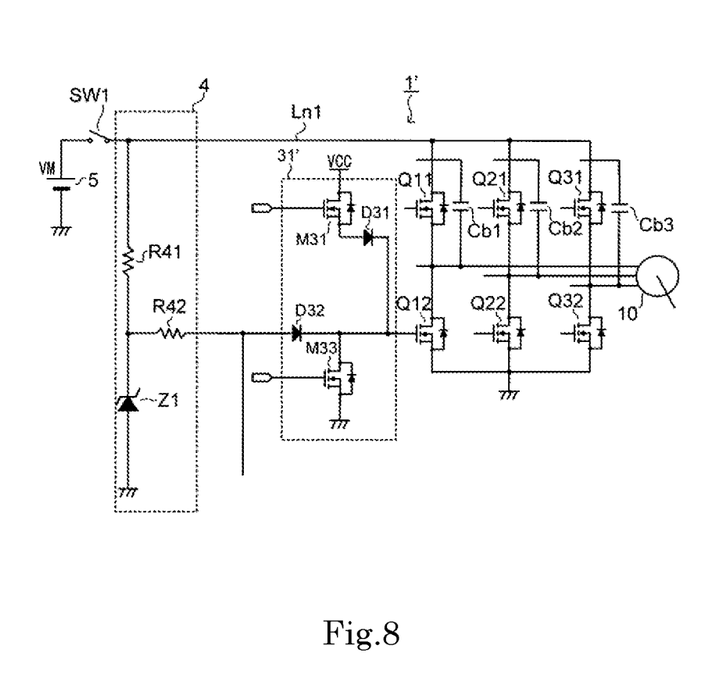
FIG. 8 is a diagram that illustrates a configuration of a motor drive circuit according to a modification of an exemplary embodiment of the present invention.

FIG. 8 is a diagram that illustrates a configuration of a motor drive circuit 1' according to a modification. The different point of the configuration of the motor drive circuit 1' comparing with the abovementioned embodiment is a configuration of a first lower FET gate drive circuit 31'. The first lower FET gate drive circuit 31' has a configuration in which no pull element connected in series with the push element M31 is provided. Since the pull element M32 does not function in the abovementioned embodiment, it is possible to not provide the pull element from the start like this embodiment. Note that, although it is not illustrated in FIG. 8, the second lower FET gate drive circuit and the third lower FET gate drive circuit may also have the configuration in which no pull element is provided.

Figure 9:
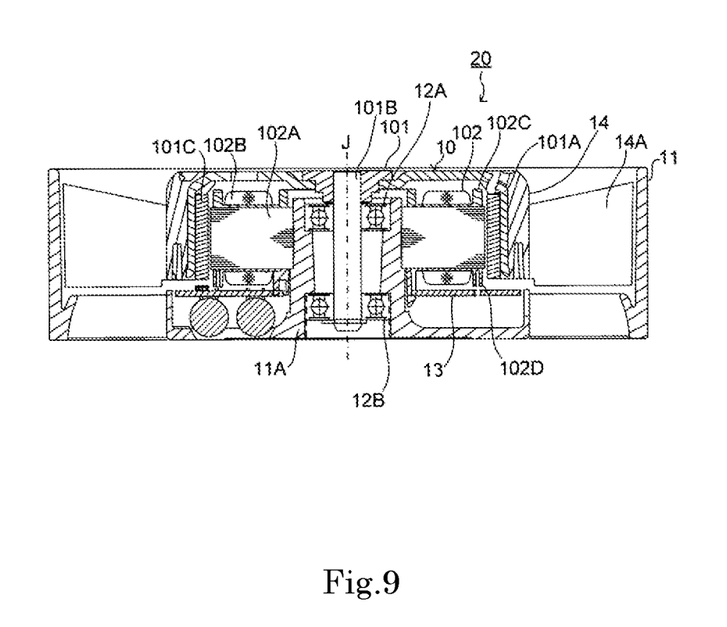
FIG. 9 is a side cross-sectional view that illustrates a configuration example of a blower.

Next, as an example of application target of the motor drive circuit according to the embodiment of the present disclosure, a configuration of a blower is described with reference to FIG. 9. FIG. 9 is a side cross-sectional view that illustrates a configuration example of the blower. Note that, a direction in which a rotational axis J of the motor 10 in FIG. 9 extends is a vertical direction in the following description. It should be noted that the vertical direction does not indicate the actual direction when disposing the blower.

The blower 20 illustrated in FIG. 9 includes the motor 10, a housing 11, bearings 12A and 12B, a circuit board 13, and a propeller 14.

The motor 10 includes a rotor 101 and a stator 102. The rotor 101 rotates about the rotational axis J. The rotor 101 includes a rotor case 101A, a rotor shaft 101B, and a rotor magnet 101C. The rotor case 101A is formed in a cylinder shape including a lid on one side. The rotor shaft 101B is fixed to the center of the rotor case 101A and rotates about the rotational axis J. The rotor magnet 101C is fixed to an inner wall of the rotor case 101A.

The propeller 14 is fixed to an outer periphery of the rotor case 101A. The propeller 14 includes multiple wings 14A arranged in a circumferential direction of the rotor 101. Accordingly, the propeller 14 rotates with the rotation of the rotor 101.

The housing 11 stores the rotor 101, the stator 102, the circuit board 13, and the propeller 14 inside thereof. The housing includes a bearing holder 11A in the center thereof. The bearings 12A and 12B are held by the bearing holder 11A. The bearings 12A and 12B are formed of ball bearings. The rotor 101 is rotatably supported by the bearings 12A and 12B via the rotor shaft 101B.

The stator 102 is fixed to the bearing holder 11A and is arranged on an outer periphery side of the rotor 101. The stator 102 includes a stator core 102A, windings 102B, and insulators 102C and 102D. The stator core 102A includes multiple salient poles. The upper and lower insulators 102C and 102D cover upper and lower surfaces of the stator core 102A and a slot inner surface. The winding 102B is wound on each salient pole of the stator core 102A via the insulators 102C and 102D. An outer periphery of each salient pole of the stator core 102A faces an inner periphery of the rotor magnet 101C with an air gap in between.

The circuit board 13 having a disk shape is arranged between the bottom of the housing 11 and the stator 102. The insulator 102D is provided with a binding pin to which an end of the winding 102B is bound. Once the binding pin is passed through a connection hole of the circuit board 13 and soldered, the circuit board 13 is supported on the stator 102 while the end of the winding 102B is electrically connected to patterns on the circuit board 13 via the binding pin.

The motor circuit according to the abovementioned embodiments can be implemented on the circuit board 13. That is, the blower 20 includes the motor device including the motor drive circuit and the motor 10, and the propeller (impeller) 14 that is rotationally driven by the motor 10.

As describe above, the motor drive circuit according to the embodiments of the present disclosure can drive the motor 10 with the 180-degree conduction mode; thus, particularly, it is possible to achieve a suitable driving mode for the blower 20 for which noise reduction and efficiency improvement are required. For example, when the blower 20 is used as a fan for cooling a device such as a rooter in a base station of cellphone and the like, multiple blowers are aligned to be used; in this case, the propeller 14 of the blower 20 that is stopped under the not-conducting state may be rotated by the strong wind from another operating blower. In this case, the external force is applied to the motor 10; however, the motor drive circuit can apply the short brake to the motor 10 as described above. Thus, while a worker installs or maintains the blower 20, there is no obstruction of the works.

For example, instead of the first diode D31, a switch for switching on and off may be provided as the rectifier. In this case, the above switch may be turned on in the normal time in which the motor 10 is driven and the above switch may be turned off in the not-conducting state. Note that, the configuration is simpler if using the diode as the rectifier.

The lower FET gate drive circuits connected to the brake circuit are provided for all the lower switching elements in the above embodiment; however, the lower FET gate drive circuit connected to the brake circuit may be provided for only a part of the lower switching elements, and the push-pull circuit not connected to the brake circuit may be provided for the rest of the lower switching elements.

The present disclosure can be utilized in a motor drive circuit for driving a brushless DC motor mounted in a blower, for example.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor drive circuit comprising: an upper switch;
a lower switch connected in series with the upper switch;
a gate drive circuit that drives the lower switch; and
a brake circuit that uses an inductive voltage generated by the brushless DC motor to apply a voltage to a gate terminal of the lower switch via the gate drive circuit and turns on the lower switch; wherein
the gate drive circuit includes:
a push element to apply a predetermined source voltage to the gate terminal when the push element is turned on;
a pull element to pull out charge from the gate terminal when the pull element is turned on; and
a rectifier between the push element and the gate terminal to rectify current in a direction from the push element toward the gate terminal; wherein the gate drive circuit further includes a second pull element connected in series with the push element.

2. The motor drive circuit according to claim 1, wherein a plurality of pairs, each including the upper switch element and the lower switch, are provided corresponding to a plurality of phases of the brushless DC motor.

3. The motor drive circuit according to claim 2, wherein a plurality of the gate drive circuits are provided corresponding to a plurality of the lower switches.

4. The motor drive circuit according to claim 1, wherein the rectifier is a first diode; and
an anode of the first diode is connected to the push element.

5. The motor drive circuit according to claim 4, wherein a cathode of the first diode is connected to the gate terminal.

6. The motor drive circuit according to claim 1, wherein the pull element is a transistor that includes a control terminal, a current inflow terminal, and a current outflow terminal; wherein
the current inflow terminal is connected to the gate terminal; and
a potential lower than a potential applied to the gate terminal is applied to the current outflow terminal.

7. The motor drive circuit according to claim 1, wherein the gate drive circuit includes a second diode; and
a cathode of the second diode is connected to the gate terminal.

8. The motor drive circuit according to claim 7, wherein an anode of the second diode is connected to the brake circuit.

9. The motor drive circuit according to claim 1, wherein the brake circuit further includes at least one resistor to convert the inductive voltage to a voltage lower than the inductive voltage and to apply the converted voltage to the gate terminal.

10. The motor drive circuit according to claim 1, wherein the brake circuit further includes a Zener diode; and
a cathode of the Zener diode is connected to a path to apply voltage to the gate terminal based on the inductive voltage.

11. The motor drive circuit according to claim 10, wherein a predetermined potential is applied to an anode of the Zener diode.

12. A motor device, comprising:
the motor drive circuit according to claim 1; and
a brushless DC motor driven by the motor drive circuit.

13. A blower, comprising:
the motor device according to claim 12; and
an impeller rotationally driven by the brushless DC motor.

14. The motor drive circuit according to claim 1, wherein the rectifier is directly electrically connected between both of the push element and the gate terminal.

* * * * *